US010387893B2

(12) United States Patent
Christian

(10) Patent No.: US 10,387,893 B2
(45) Date of Patent: Aug. 20, 2019

(54) NON-ELECTRONIC PERSONAL ARTICLES WITH RECONFIGURABLE SURFACES AND A SUBSCRIPTION-BASED SYSTEM FOR OPERATING WITH SAME TO ENABLE TARGETED, NON-ELECTRONIC, DISTRIBUTED MOBILE ADVERTISING

(76) Inventor: Sean Michael Christian, Land O'Lakes, FL (US)

( * ) Notice: Subject to any disclaimer, the term of this patent is extended or adjusted under 35 U.S.C. 154(b) by 0 days.

(21) Appl. No.: 13/221,574

(22) Filed: Aug. 30, 2011

(65) Prior Publication Data
US 2012/0226555 A1 Sep. 6, 2012

Related U.S. Application Data

(60) Provisional application No. 61/378,367, filed on Aug. 30, 2010.

(51) Int. Cl.
*G06Q 30/00* (2012.01)
*G06Q 30/02* (2012.01)
*H04M 3/487* (2006.01)

(52) U.S. Cl.
CPC .......... *G06Q 30/02* (2013.01); *H04M 3/4878* (2013.01); *H04M 2207/18* (2013.01)

(58) Field of Classification Search
USPC .......................................................... 705/14
See application file for complete search history.

(56) References Cited

U.S. PATENT DOCUMENTS

| 5,234,230 A * | 8/1993 | Crane ...................... A63C 3/00 280/811 |
| 2006/0265290 A1* | 11/2006 | Perrier et al. .................... 705/26 |
| 2009/0020614 A1* | 1/2009 | Gelbman ...................... 235/492 |
| 2012/0047008 A1* | 2/2012 | Alhadeff et al. ........... 705/14.16 |

OTHER PUBLICATIONS www.squidoo.com.*

* cited by examiner

*Primary Examiner* — Alvin L Brown
(74) *Attorney, Agent, or Firm* — Kurtz Firm, PLLC

(57) ABSTRACT

A method for operating with reconfigurable personal articles to enable targeted distributed mobile advertising is disclosed. A web server is provided for product registration. The web server receives identifying personal data from a mobile subscriber and stores the personal data in a database. Non-identifying demographic data is received from the mobile subscriber and stored in the database. A unique serial number associated with a reconfigurable article purchased by the mobile subscriber and is received and stored in the database, in association with the mobile subscriber. A portal accessible via the world wide web is created for the mobile subscriber. A patch having an advertisement thereon is sent to said mobile subscriber for display on the reconfigurable article, and advertisers are provided with electronic access to the non-identifying demographic data. A personal article with a reconfigurable surface substantially covering each exposed exterior surface is disclosed.

7 Claims, 10 Drawing Sheets

NON-ELECTRONIC PERSONAL ARTICLES WITH RECONFIGURABLE SURFACES AND A SUBSCRIPTION-BASED SYSTEM FOR OPERATING WITH SAME TO ENABLE TARGETED, NON-ELECTRONIC, DISTRIBUTED MOBILE ADVERTISING

This application claims priority to U.S. Provisional Patent Application Ser. No. 61/378,367 filed Aug. 30, 2010, which is incorporated herein by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present invention relates in general to the field of personal articles, and in particular to a reconfigurable personal article and a subscription-based system for using the same to enable targeted distributed mobile advertising.

BACKGROUND

Various articles have been proposed that allow for attachment of adornments to personal articles. Such devices are disclosed, for example, in U.S. Pat. No. 6,519,779 and U.S. Patent Application No. US2009/01788180. However, these devices are limited in their utility, for in both cases, and as with all prior art, the articles disclosed only have limited surface area which allows for attachment of items of adornment. U.S. Pat. No. 6,519,779 discloses a hat with a small area on the front that allows an individual to change the indicia. U.S. Patent Application No. 2009/01788180 likewise discloses a garment with a limited area, defined by a pocket type architecture, which allows for attachment of adornments.

With the advent of social media sites, such as Facebook and Myspace, and the apparent growing desire by individuals to express themselves in a public fashion, the market for articles with fully reconfigurable surfaces that can be personalized by an individual is large and this market is not being addressed by prior art devices.

It is therefore an object of the present invention to provide a series of articles, with fully reconfigurable surfaces, that allow individuals to personalize their individual articles at will, which addresses the deficiencies of the prior art and allows an individual to identify or express themselves in a public manner that has not previously been possible.

It is a further object of the present invention to provide a physical and virtual, e.g., web-based, system for using such articles with reconfigurable surfaces to allow, not only individuals, but also advertisers to utilize the surfaces as distributed advertising space, which is mobile and uniquely engaging.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Reference will now be made in detail to the preferred embodiments of the present invention, examples of which are illustrated in the accompanying drawings.

In an embodiment, the invention provides a personal article, such as a backpack or belt, which is made from a material that allows its surface to be repeatedly reconfigured with items of adornment, such as patches or costume jewelry. The items of adornment can be a product or team logo, a name, a phrase, a number to indicate age, grade, or team number, a mascot, or any other personal item that an individual desires to use to express themselves. As an example, the surface can be reconfigured daily, so that the adornments are color coordinated with an individual's clothing, or it can be reconfigured on a seasonal basis as the sports which an individual participates in change. Unlike articles that are embroidered with a name or other item or adornment, the adornments on these articles can be easily reconfigured, through detachment and reattachment of another item. The preferred embodiment utilizes a method of attachment such as a hook and loop type fastening system, e.g., Velcro™. If an item of adornment possesses a backing, such as Velcro's hook material, it can be adhered to any article comprising or covered entirely with a surface that is made from Velcro's loop type material. This disclosure refers to articles that contain surfaces that are reconfigurable.

Figure 1:
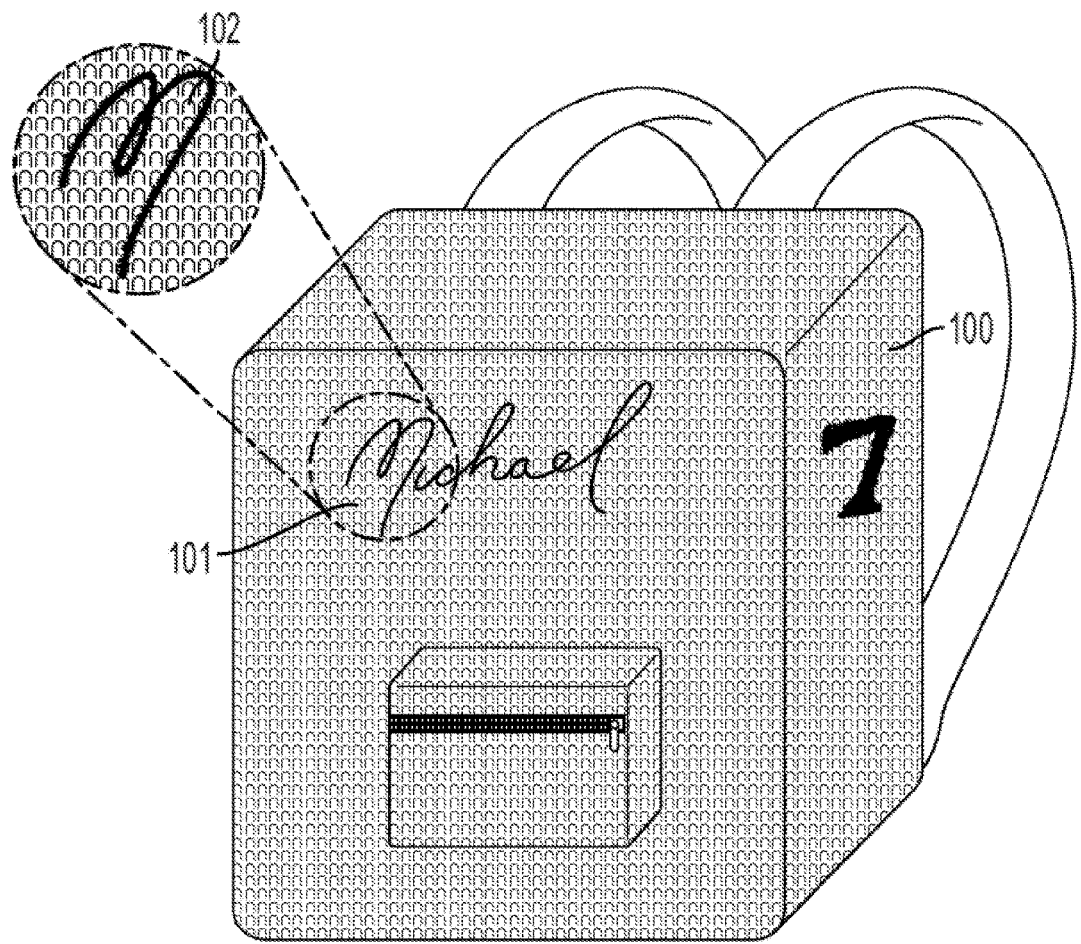
FIG. 1 is a perspective view of an article that represents the current art, which illustrates and article with an embroidered name and number which is not easily reconfigurable.

FIG. 1 illustrates an article which uses the current art, embroidery, to identify or personalize and article. This method of personalization or identification is not easily reconfigured. Shown in FIG. 1 is an article 100, which in this case is a backpack, that has a name 101 and a number embroidered on the backpack. An exploded view of the stitching 102 of the embroidered name is also shown.

Figure 2:
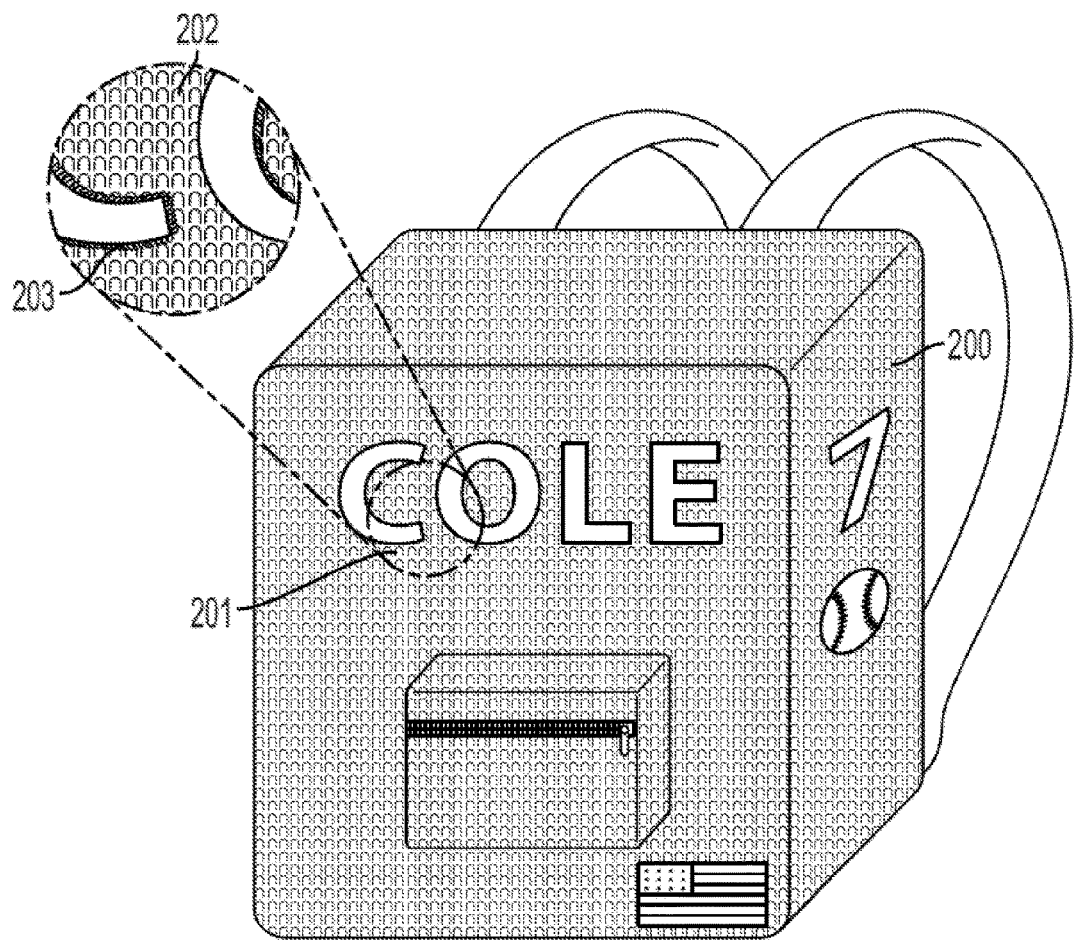
FIG. 2 is a representative front view of an article according to the present invention that possesses a surface that allows for items of adornment, such as a name, number, flag, or an item which signifies an affiliation with a sport to be adhered to the surface that can be easily reconfigured by an individual if desired.

FIG. 2 illustrates an article 200, which in this case is a backpack, according to the present disclosure, that employs a surface that is easily reconfigured. In this illustration, a name 201 has been attached, as has a number, a US flag, and an item that signifies an affiliation with a sport. An exploded view of the first two letters of the name 201 shows the surface 202, which in this illustration is a loop type architecture, such as with Velcro's hook and loop type material. In addition, the hook type architecture backing of the letters 203 is also illustrated.

Unlike prior art devices which may have small areas with reconfigurable surfaces, such as commonly used in the military for insignia, the articles of the present disclosure may have surfaces that are fully reconfigurable.

Figure 3:
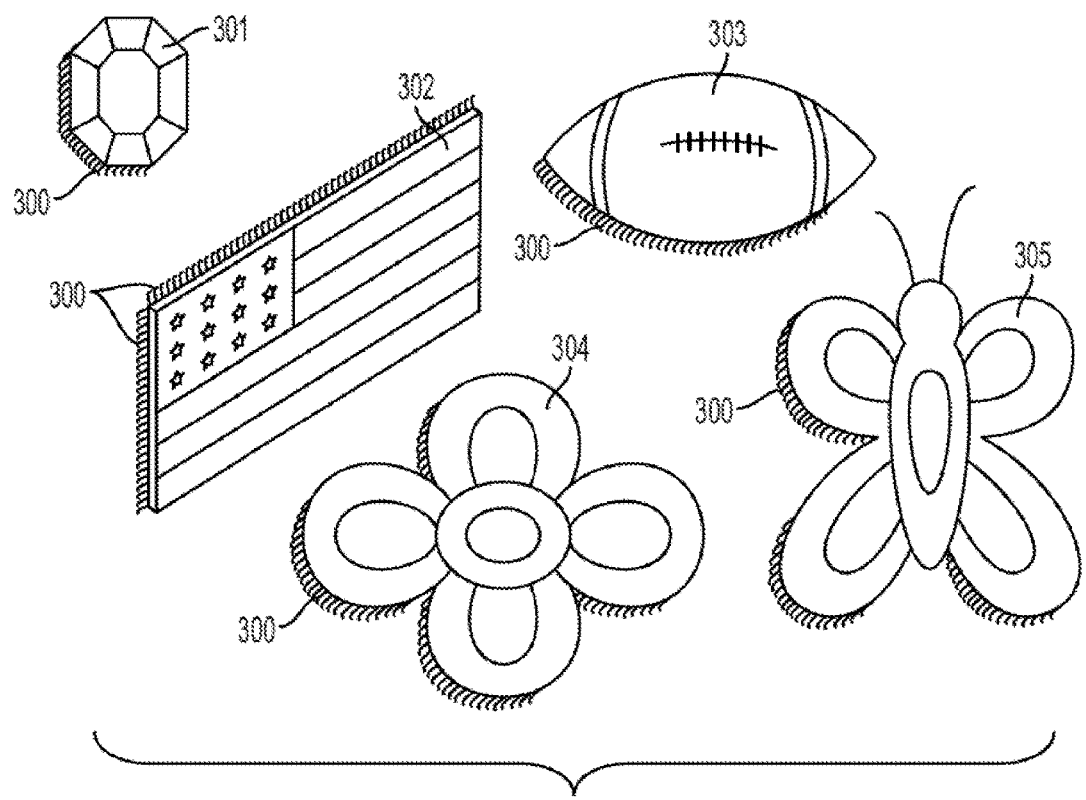
FIG. 3 is a side view of multiple items of adornment according to the present invention which show a back surface, such as a hook type architecture that allows for attachment of the item to an article, such as shown in FIG. 2.

FIG. 3 illustrates a front-side view of multiple items of adornment 301-305 where the hook type architecture backing on the items is clearly visible 300. Shown are costume jewelry 301, a US flag 302, a football 303, a colorful flower 304, and a colorful butterfly 305.

Figure 4:
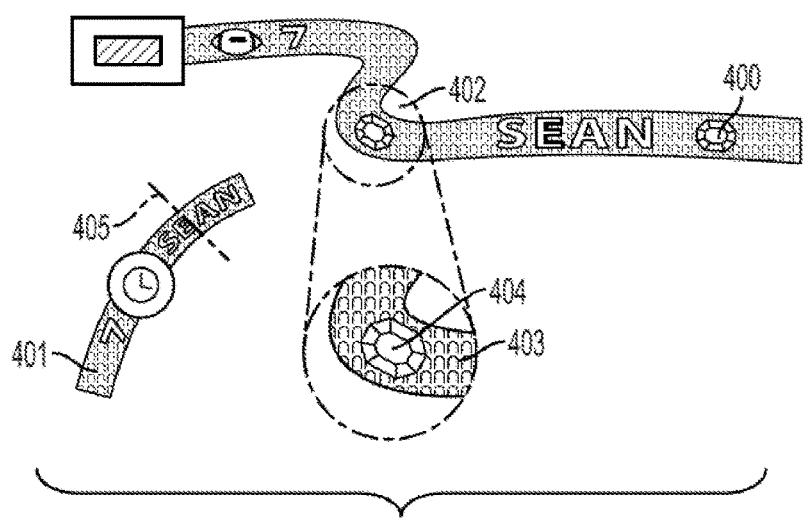
FIG. 4 is a front view of two different articles according to the present invention which have reconfigurable surfaces. An expanded view of the articles surface clearly shows the surface architecture, which in this case is of a loop type architecture.

FIG. 4 illustrates two additional articles, a belt 400 and a watch band 401, with reconfigurable surfaces 403 that allow for adornment by items such as 404. An exploded view of area 402 is shown in which the reconfigurable surface 403 and an item of adornment 404 are clearly shown.

Figure 5:
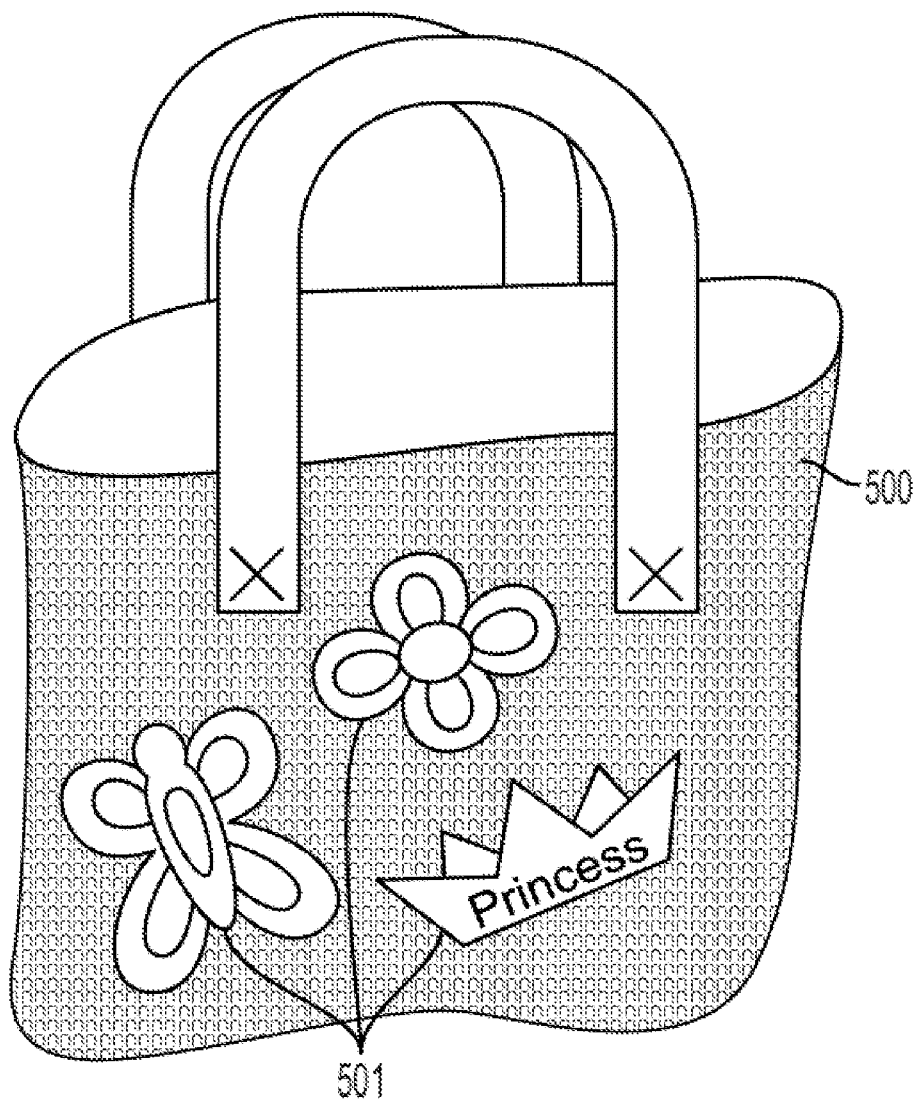
FIG. 5 is a front view of a bag type article according to the present invention which has been decorated with colorful items of adornment.

FIG. 5 illustrates a handbag 500 that is decorated with colorful items of adornment 501 for personalization of color coordination with an individual's wardrobe.

Figure 6:
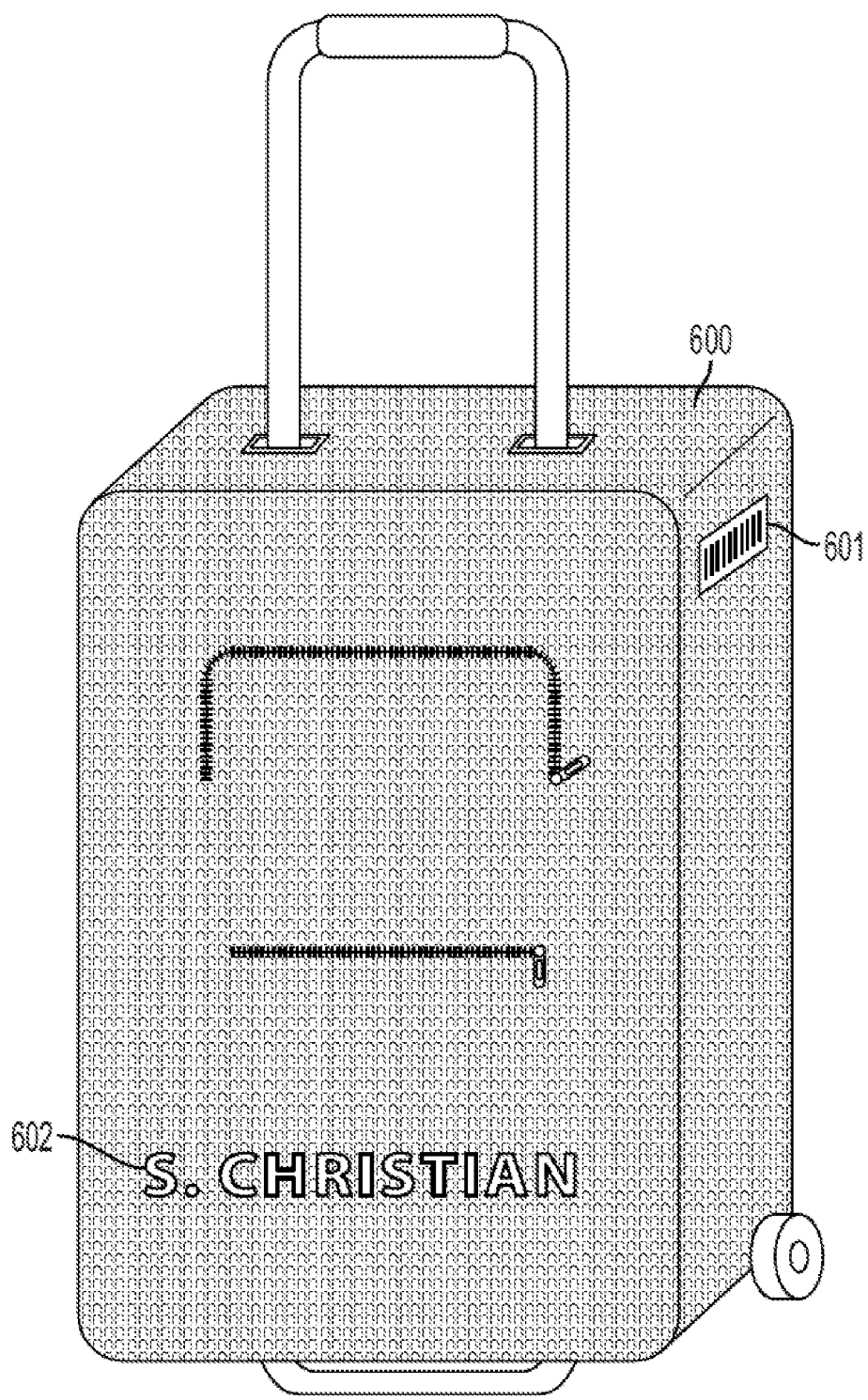
FIG. 6 is a front view of a suitcase type article according to the present invention which has been decorated with a name for easy identification, and a barcode patch that has been encoded with personal information in case of loss. It is important to note that it is easy to change the name on the bag if another traveler decided to borrow the article.
Figure 7:
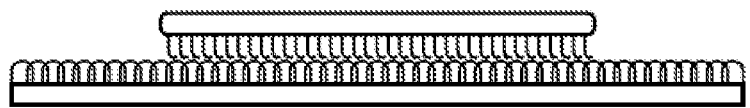
FIG. 7 is a cross sectional view of the present invention seen in FIG. 4, taken along line 405 of that drawing.

FIG. 6 illustrates a suitcase 600 that has a surface that is fully reconfigurable. Shown are an individual's name 602 and a personal barcode 601 that can be used for identification. FIG. 7 illustrates the method of attachment. It is a cross-sectional view for line 405 of FIG. 4 showing the composite nature of the method of attachment using an item of adornment, in this case the letter E, which has a hook type architecture backing, and the surface of a watchband 401 that is constructed of a material with a loop type architecture.

The present invention is described below with reference to flow diagrams and operational illustrations of methods and devices to utilize personal articles with reconfigurable surfaces in a subscriber-based system for targeted distributed mobile advertising. It is understood that various blocks of the flow diagrams or operational illustrations, and combinations of blocks in the flow diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the flow diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Processes illustrated in the flow diagrams may be implemented in the form of computer code executed by such processor and stored on a non-transitory computer-readable medium, such as a computer disk, a flash drive, or non-volatile memory.

In further embodiments, the invention provides a computerized system and method which utilizes personal articles with reconfigurable surfaces as a means for distributing advertising. Specifically, the system and method allows advertisers to place small ads on mobile articles that are carried in public by mobile advertising subscribers; hereafter referred to as mobile subscribers. In order to subscribe, subscribers simply register via a web page to be mobile carriers of an advertisement in the form of an adornment, such as a patch with a logo and promotional information thereon. Once a mobile carrier has subscribed, they are able to provide a list of interest in addition to their geographic location. Once known, this information is used to match subscribers with advertisers which have registered with the system. Advertisers have the ability to provide matched subscribers with mobile ad content and, in addition, advertisers have the right to compensate matched subscribers through rewards or other forms of compensation.

In an embodiment, the system provides a portal that an advertiser can log into to define and manage an advertising campaign that places patches with mobile subscribers, which act as localized billboards, in targeted geo-spatial and socio-economic market segments. Likewise, the system provides each mobile subscriber with a customizable portal which allows a subscriber to log in and define his interests, i.e., the topics which he or she would like to promote, as well as his or her demographics. Such demographics include those things which will permit an advertiser to select the mobile subscriber as a carrier, such as the mobile subscriber's age, town of residence, address, school, grade level, etc.

Upon registration of a new subscriber, the subscriber's information is stored in a secure database accessible to one or more servers that operates as a front end, providing the portals described above. At that time, the user's personal information, interests, and demographic information are stored in the database. At registration, a virtual ID is assigned to each mobile subscriber and also stored in the database in association with the subscriber's other data.

The system may be configured to provide a virtual clearinghouse, particularly for minors under the age of 18. The virtual clearing house prevents access by any third party, such as an advertiser, to the mobile subscriber's personal identifying information, hereby referred to as their physical ID, which includes information such as his or her name, specific address, email address, etc. The virtual ID provides the advertiser with access to non-identifying data such as general geographic location, age range, school affiliation, interests, and the like. In this respect, the system can be configured to act as a trusted intermediary which provides a firewall between a mobile subscriber's personal data in the database and advertisers or non-subscribers. As noted above, advertisers have the ability to compensate match subscribers through rewards or other forms of compensation. The disclosed system can be configured as an intermediary so that such compensation can be made from the advertiser to a mobile subscriber's virtual ID without disclosure of the mobile subscriber's physical ID to the advertiser.

Figure 8:
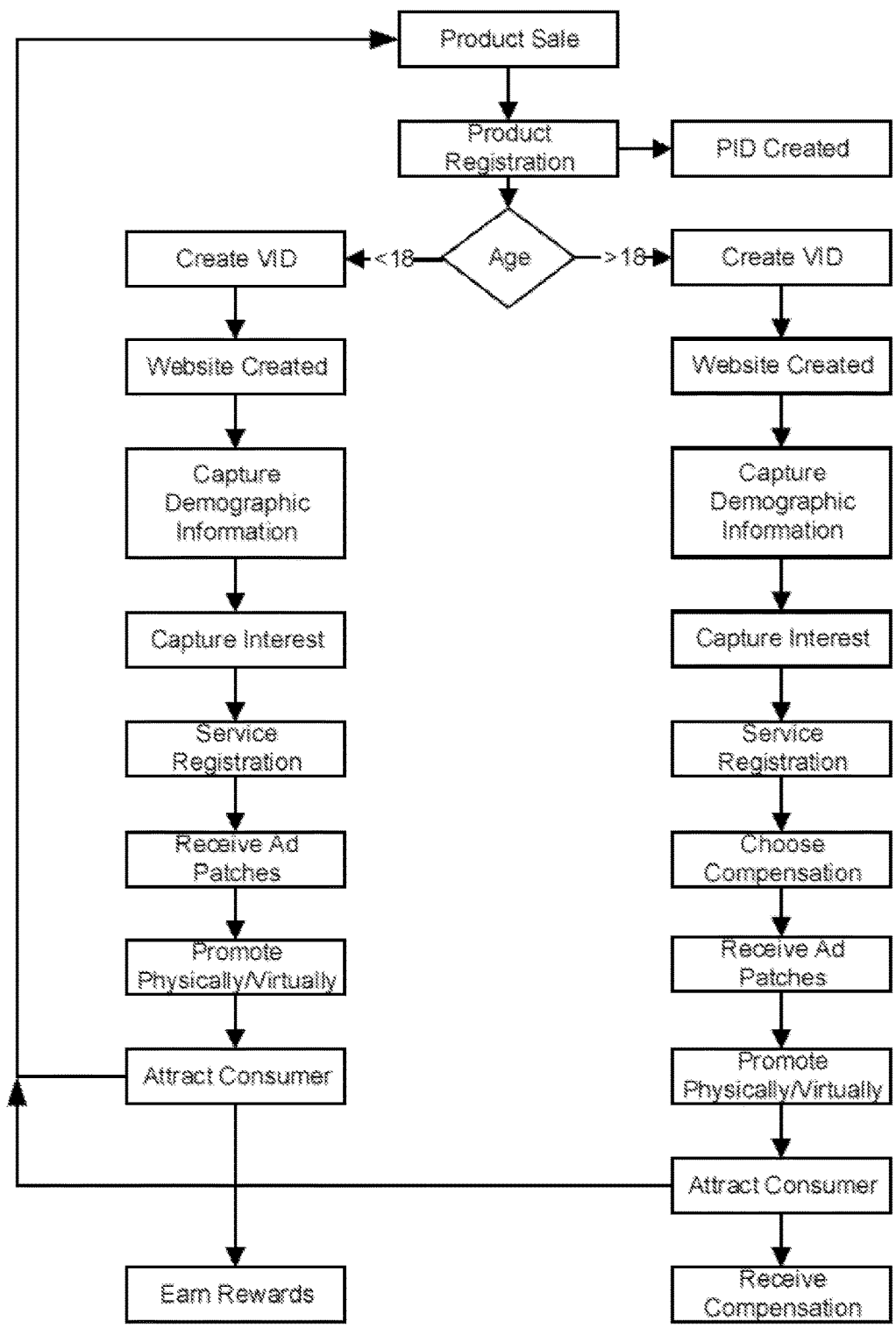
FIG. 8 is a flow diagram showing a method for operating the system in connection with a mobile subscriber.

Additionally, the system may be configured to provide an online storefront which allows consumer-to-consumer transactions such as purchasing, trading and selling of patches between mobile subscribers using their virtual IDs. In this respect, the system allows virtual ID-to-virtual ID exchanges (i.e., a virtual clearinghouse) while protecting the disclosure of one or both of the mobile subscribers' physical IDs. Such virtual ID-to-virtual ID exchanges may be facilitated by configuring the system to provide an auction type listing site, an e-commerce type listing site, a free-of-charge trading site, or any combination thereof FIG. 8 shows a flow chart illustrating a method of using the system from a consumer and subsequent, mobile subscriber's perspective. The method begins with the sale of a product, e.g., the reconfigurable article described above. The product preferably has associated with it a unique serial number which can be registered with the system. The owner of the product then visits the web site of the system and may choose to register their product and themselves as a mobile subscriber, as described above. At this point a physical ID (PID) is created and stored in the database. Next, the process branches in accordance with the subscriber's age. The fundamental difference between these two branches is that subscribers over a certain age, for example 18, may be provided with the ability to be compensated for displaying advertisers' patches in manners that are not available to subscribers under that age. For example, a mobile subscriber under the age of 18 may be prevented from using the system to earn cash. Next, the user creates a virtual ID (VID) and the VID is mapped to the subscriber's physical ID in the database.

The system next creates a product-specific website for the new subscriber's product which can be viewed by the mobile subscriber when logging in to the portal. The product-specific website may show a manipulatable 2D or 3D rendering of the product, for example a virtual backpack with a reconfigurable surface, with any patches thereon which have been acquired by the consumer/mobile subscriber. The web site may display on a first page the patches the consumer/mobile subscriber has purchased, and display on a second page the patches the mobile subscriber is displaying with advertising on them for compensation. To obtain compensation, the mobile subscriber may be required to virtually place an advertising patch on his or her virtual article. The virtual reconfigurable article is thus representative of the configuration of the physical reconfigurable article. The system can then convey real-time information to advertisers as to the demographics (i.e., an encoded map) and numbers (i.e., statistics) of mobile subscribers displaying the advertiser's advertisement. Each mobile subscriber may have multiple virtual reconfigurable articles viewable and manipulatable on his or her website. The system may, for example display to a single mobile subscriber a virtual reconfigurable backpack, reconfigurable purse, reconfigurable book bag, and reconfigurable beach bag, each representing a physical product that has been separately purchased. In this respect, one VID can be assigned to multiple product serial numbers. The system may be configured such that advertisers may choose to advertise, for example, on backpacks but not belts. That is, the system gives the advertiser the ability to view what products are held by a mobile subscriber and specify the desired location of their advertisement. The system may be configured to allow the consumer/mobile subscriber to drag and drop a particular virtual patch from one virtual article to another.

In one embodiment, the reconfigurable article may comprise an electronically reconfigurable fabric, using currently available electronic paper technology, such as e-paper, that allows display of digital images thereon. In this manner, the reconfigurable article may be remotely managed by the system to display a specific active set of electronic patches. This embodiment allows automatic updating of the physical article by the system to display active patches in accordance with patches that have been purchased or otherwise acquired by the mobile subscriber through the system. Transmission of active patches to the electronically reconfigurable article may be wireless, using, e.g., Wi-Fi, Bluetooth, or a mobile data network.

With this embodiment, the system can utilize a retail model which compensates mobile subscribers with local retailer coupons based on their current geographic location and these coupons can be displayed on the electronically reconfigurable fabric in real-time for the mobile subscribers use or anyone's use who is in the vicinity of the mobile subscriber.

Matched mobile subscribers may be provided with compensation for referrals. In this respect, a first mobile subscriber may be provided with compensation each time he or she brings a new consumer to the system and that new consumer registers and makes reference to the first subscriber. Such compensation may be provided by an advertiser with whom both the first subscriber and the new subscriber are matched. If the first mobile subscriber is under the age of 18, for example, they may be provided with certain rewards as an alternative to monetary compensation for attracting new consumers.

Figure 9:
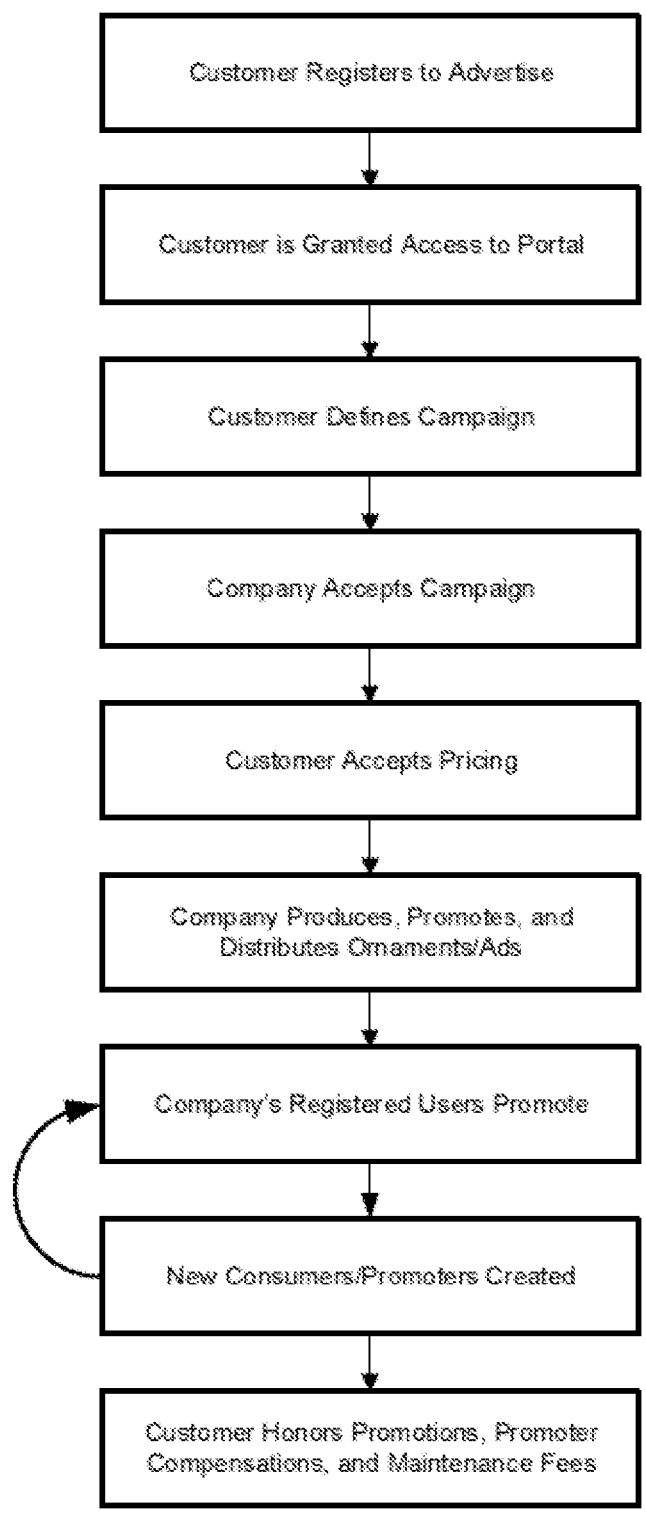
FIG. 9 is a flow diagram showing a method for operating the system in connection with an advertiser.

FIG. 9 shows a method of using the system from an advertiser's perspective. As noted above, in an embodiment, the system provides a portal that an advertiser can log into to define and manage an advertising campaign that places patches with mobile subscribers, which act as localized billboards, in targeted geo-spatial and socio-economic market segments. Campaign data managed by the system and used to create targeted campaigns may include, e.g., ad content, volume, geographic local (i.e., state, city, school, organization), age, grade level, gender, and special interests (i.e., football, boy scouts, etc.). The system may be configured to operate differently for different types of advertisers, such as local, national, and international advertisers. With respect to national advertiser, the system can be configured to allow such advertisers to use the system purely to promote a product or service that could be consumed anywhere nationally. On the other hand, the system may be configured to drive local business to local advertisers, such as a restaurant, restaurant chain, or local business serving a specific community. Likewise, the system may be configured to allow local organizations, such as local sports teams, charities, and schools, to use the system as a fundraising tool.

Examples of use of the distributed advertising system of the invention include the following. Media companies may desire to publicize the release of a new record months in advance to a specific age demographic; game manufacturers may use the system to publicize the release of a new game in advance of the games release to a specific gender demographic; media companies may use the system to publicize the release of a movie in advance to a specific demographic and region.

The proposed method of advertising allows advertisers to place thousands or even millions of ads on mobile articles in specific geographic and demographic settings in a very cost-effective manner. Not only is the delivery of these ads targeted, but these ads are both mobile and potentially, vocal, due to the fact that the mobile subscriber is incentivized to vocalize the ad content.

In an embodiment, the system allows users to subscribe via a web page. In connection with that subscription, the subscriber submits personal demographic information such as age, gender, city of residence, school affiliation, grade level, and the like. This information is stored in a database.

With a database of such demographic information, the system can be configured to provide an adornment, such as a patch, with promotional information that is targeted to the particular demographics of the mobile subscriber. As part of the subscription process, the subscriber agrees to place the adornment on their backpack or other personal article. The system can be configured to provide the subscriber with their own personalized web page in connection with subscribing to the system. The patches or other adornments may be sent to each mobile subscriber for free or at a nominal charge in exchange for their display of the adornments on their personal articles. Alternatively, the system may be configured so that the mobile subscriber receives compensation in exchange for agreeing to display the adornment. Such compensation may be monetary, online reward points, online credits, or other suitable compensation.

In accordance with an embodiment, each mobile subscriber is provided with a code that entitles the bearer to a discount in connection with the goods or services advertised on the subscriber's patches. For example, if the patch is a logo for an upcoming release of a popular video game, the subscriber wearing the patch can provide his code to his friends and this will entitle the friends to a discount on the purchase of the upcoming video game title at an online or bricks-and-mortar retailer. When the system is configured in such manner, the system facilitates mobile distributed promotion and the transition from visual-to-vocal advertising, i.e., targeted promotion.

In accordance with an embodiment, since the articles with reconfigurable surfaces and the adornments are serialized and associated with a particular mobile subscriber in the system through their VID, the system is able to provide child protection services. For example, backpacks or articles of adornment may be provisioned with an RFID tag, or alternatively, linked to an active tracking device or a mobile subscriber's cell phone/smart phone through a system application. If a child becomes lost, and is subsequently found, the system can be used to notify parents by simply providing the system with a product serial number or mobile subscriber ID. Alternatively, if a child is abducted, the system can be used to activate specific measures to help locate the child, such as issuing an amber alert while simultaneously tracking any active location devices in addition to notifying DOT to monitor automated toll/RFID readers in the vicinity of last known location for the child who has an RFID embedded tag.

In this embodiment, the RFID tag can be embedded in the reconfigurable article or article of adornment, or the location tracking device can be placed in the reconfigurable article. When a child who is a registered mobile subscriber becomes missing, his or her parents can then contact the operator of the disclosed system to obtain location information from such tracking device. In this respect, subscriptions to a service which allows a parent to obtain location information of articles or patches associated with his or her child can be sold or otherwise provided to the parent on a monthly, weekly, or daily basis. By simply calling the operator of the system and providing a serial number of an article or patch being carried by the child, the parent can obtain such location information and/or trigger an amber alert.

Alternatively or in addition, the system can be configured to provide a subscriber with a monetary reward if the subscriber allows the system to track their location, since the location information can be used by the system to conduct targeted advertising by selecting appropriate patches or other adornments to send to a particular subscriber based on the subscriber's movements, e.g., locations where the subscriber frequents.

Figure 10:
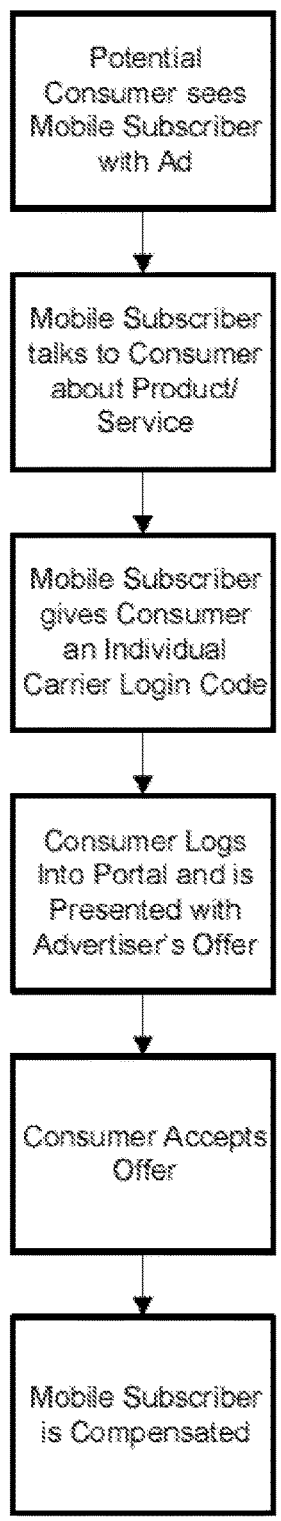
FIG. 10 is a flow diagram showing a method for using the system to compensate a mobile subscriber.

FIG. 10 is a flow diagram showing a method for using the system to compensate a mobile subscriber. As noted above, a mobile subscriber may carry a reconfigurable article with advertising patches or other means for displaying an ad. The compensation process, in an embodiment, begins with a potential consumer viewing the mobile subscriber's ad, thereby creating an ad impression. By word of mouth or by display, the mobile subscriber gives the potential consumer an individual carrier login code. The potential consumer then logs into a website or portal operated by the manager of the system and is presented with an advertiser's offer. Once the potential consumer accepts the offer, the mobile subscriber is compensated. The compensation may come in the form of reward points in a reward system such as a frequent flyer reward system, gift cards to one or more retailers, an actual cash transfer, goods, or services.

Figure 11:
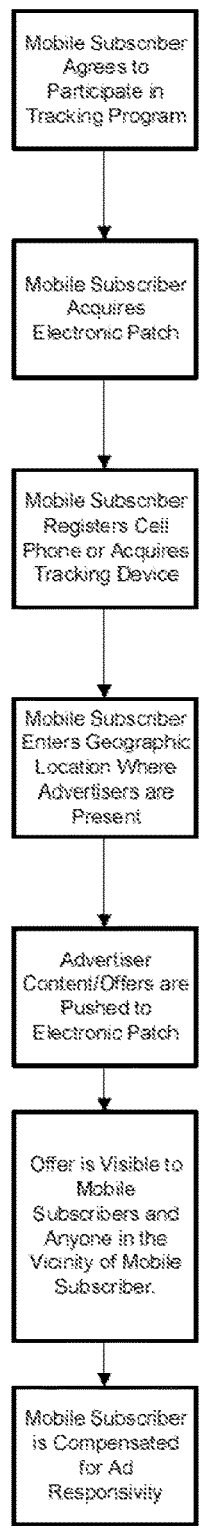
FIG. 11 is a flow diagram showing a method for operating the system in connection with electronic patches, mobile subscribers, and real-time geo-spatial, targeted advertising.

FIG. 11 is a flow diagram showing a method for operating the system in connection with electronic patches, mobile subscribers, and real-time geo-spatial, targeted advertising. After agreeing to participate in a tracking program in connection with the registration process described above, a mobile subscriber acquires a patch, e.g., an electronic patch. The mobile subscriber then registers his smart phone with the system or acquires a tracking device (e.g., an RFID or GPS-based tracking device), each of which allows the system to track the location of the reconfigurable article on which the patches are displayed, or to track the location of patches individually. Thereafter, when the mobile subscriber physically enters a geographic location where advertisers are present, such as by walking into a particular retail store or restaurant, the particular advertiser's content or offers are pushed to the electronic patch or to a smart phone associated with the mobile subscriber. At this point, the offer is made visible to the mobile subscriber and to others in the vicinity of the mobile subscriber. The mobile subscriber is compensated anytime they, or any consumer, take advantage of the local advertiser's promotion.

It will be apparent to those skilled in the art that the terms "subscriber" and "subscription" as used herein do not necessarily imply a pay-for-service type subscription system, but rather indicate that the subscriber has registered with the system.

While the invention has been particularly shown and described with reference to a preferred embodiment thereof, it will be understood by those skilled in the art that various changes in form and details may be made therein without departing from the spirit and scope of the invention.

I claim:

1. A method comprising:
   providing data store comprising mobile subscriber information;
   providing a web server comprising a computer processor coupled to the data store and configured to perform product registration in connection with a sale of a physical, non-electronic reconfigurable article for carrying non-electronic advertisements, said web server implementing the steps of:
      receiving identifying personal data from a mobile subscriber and storing said personal data in said at least one data store, in a first record associated with said mobile subscriber;
      receiving non-identifying demographic data from said mobile subscriber and storing said demographic data in said data store, in a second record associated with said mobile subscriber; and, receiving in said web server from said mobile subscriber a product registration communication concerning product registration of said physical reconfigurable article for carrying non-electronic advertisements after purchase of said physical reconfigurable article by the mobile subscriber and transforming data by storing information contained in said product registration communication in said data store, in association with said mobile subscriber, said physical reconfigurable article comprising a personal article that is carried or worn, said personal article comprising a physically reconfigurable, non-electronic material covering a majority of each exposed exterior surface of said personal article, said reconfigurable surface permitting physically reconfigurable display of items through non-electronic means of adornment comprising either advertising material or articles of personal expression, said web server being further configured to incentivize a carrier of said physical, non-electronic reconfigurable article to promote, orally and visually via said physical, non-electronic reconfigurable article, advertised products and/or services;

creating a portal accessible via the world wide web for said mobile subscriber, said portal providing interaction with mobile advertising space on a virtual reconfigurable article;

accessing said non-identifying demographic data from said mobile subscriber in said data store to select a targeted advertisement for said mobile subscriber; and, causing a physical, non-electronic patch having the targeted advertisement thereon to be sent to said mobile subscriber for display on said physical reconfigurable article.

2. The method of claim 1, wherein the web server is further configured to receive from the consumer subscriber interests of said mobile subscriber and to associate such interests with said subscriber in said data store.

3. The method of claim 1, further comprising a step of providing an electronic system for compensating said mobile subscriber for displaying said patch.

4. The method of claim 1, wherein said patch comprises a physical patch.

5. The method of claim 1, further comprising the step of compensating said mobile subscriber for attracting a second mobile subscriber.

6. The method of claim 5, further comprising the steps of:
providing to said mobile subscriber a unique code associated with said patch or with a virtual ID; and,
compensating said mobile subscriber when said second mobile subscriber enters said unique code in connection with registration.

7. The method of claim 1, further comprising the step of providing to said mobile subscriber a unique code associated with said patch, said code entitling a bearer to a discount in connection with goods or services advertised on at least one of the mobile subscriber's patches.

\* \* \* \* \*